No. 868,979. PATENTED OCT. 22, 1907.
F. J. GEEHRING.
MOLDING MACHINE.
APPLICATION FILED JAN. 23, 1907.
5 SHEETS—SHEET 1.
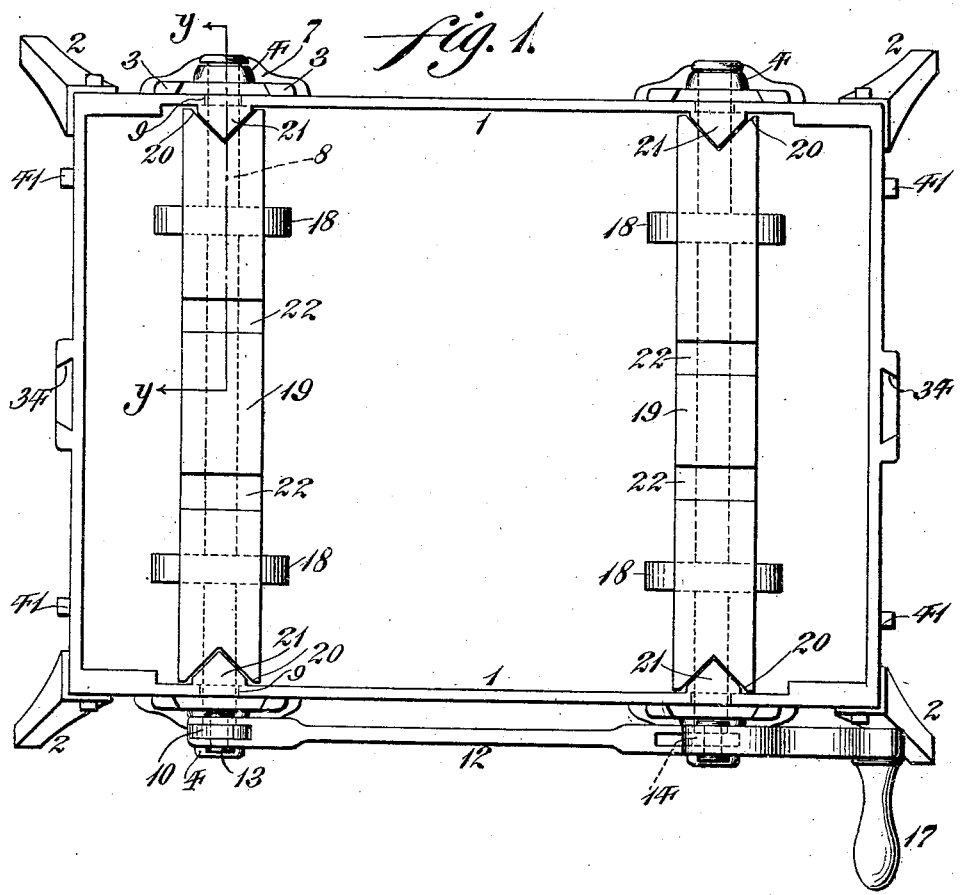
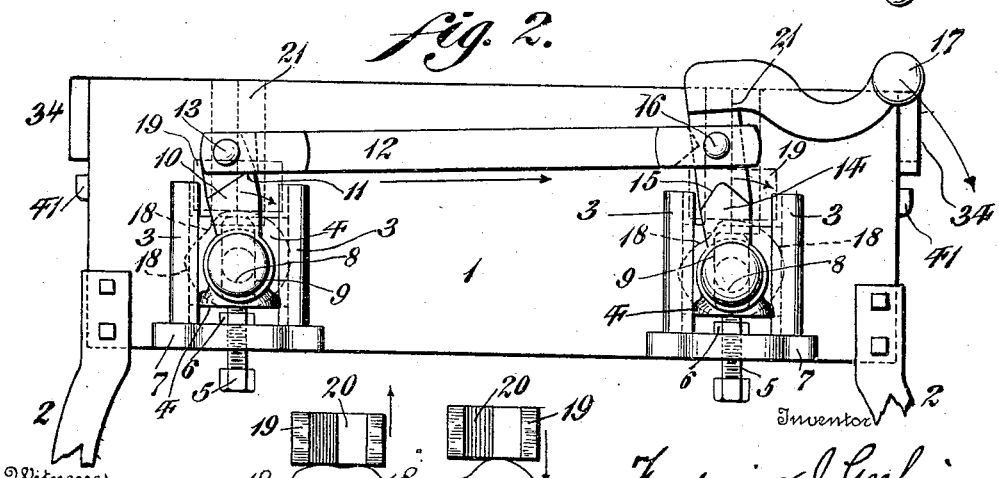
Witnesses
L. Couville,
Q. F. Nagle.
Inventor
Frederick J. Geehring.
By Diedersheim & Fairbanks
Attorneys No. 868,979. PATENTED OCT. 22, 1907.
F. J. GEEHRING.
MOLDING MACHINE.
APPLICATION FILED JAN. 23, 1907.
5 SHEETS—SHEET 2.
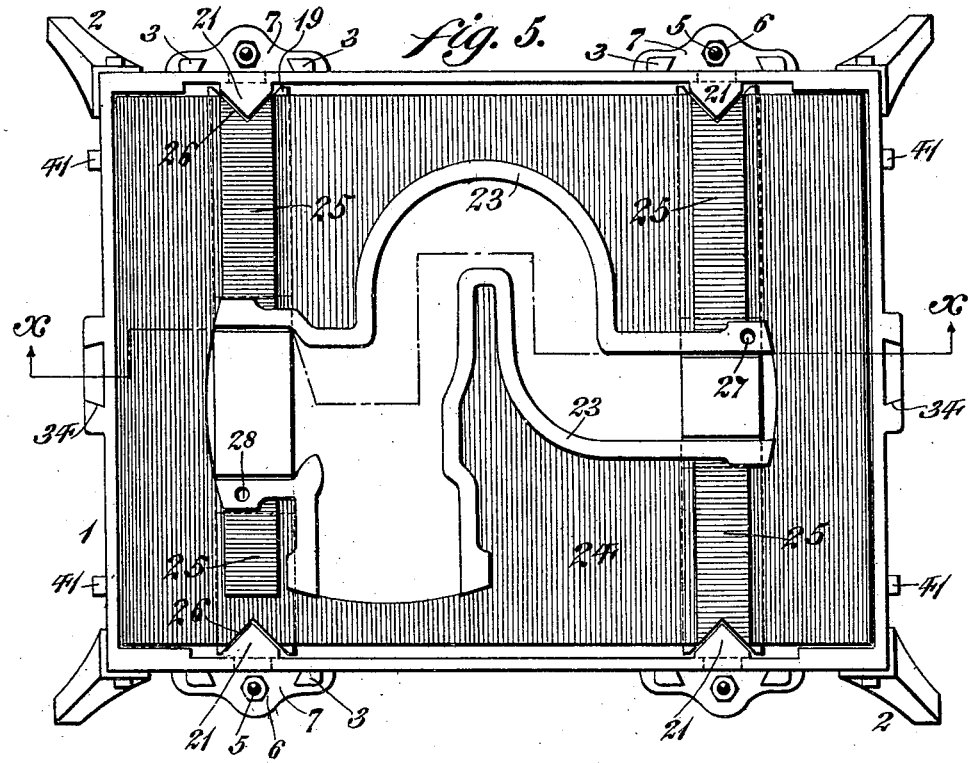
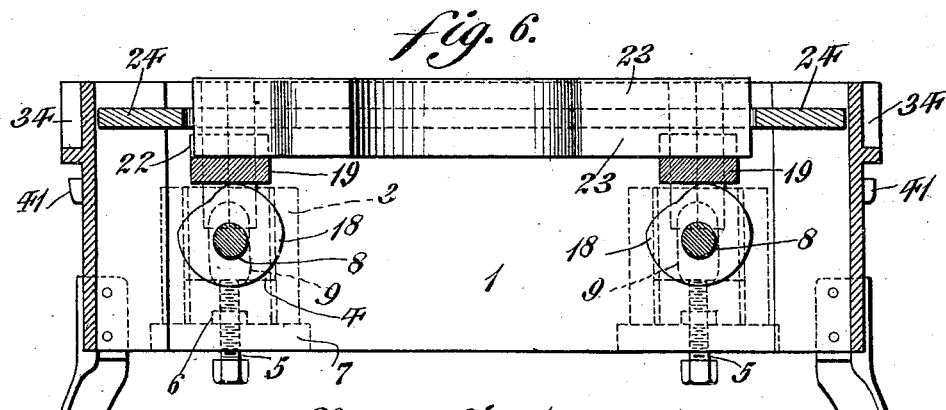
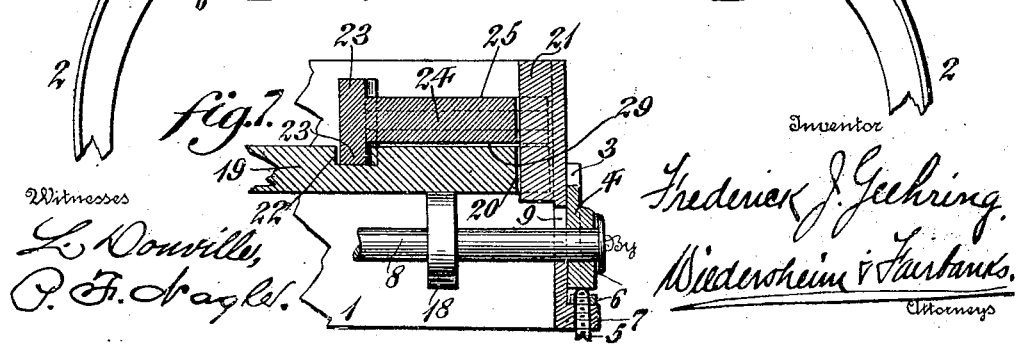

No. 868,979. PATENTED OCT. 22, 1907.
F. J. GEEHRING.
MOLDING MACHINE.
APPLICATION FILED JAN. 23, 1907.

5 SHEETS—SHEET 3.

Witnesses
L. Douville
P. F. Nagle

Inventor
Frederick J. Geehring.
By Wiedersheim & Fairbank
Attorneys

No. 868,979. PATENTED OCT. 22, 1907.
F. J. GEEHRING.
MOLDING MACHINE.
APPLICATION FILED JAN. 23, 1907.
5 SHEETS—SHEET 4.
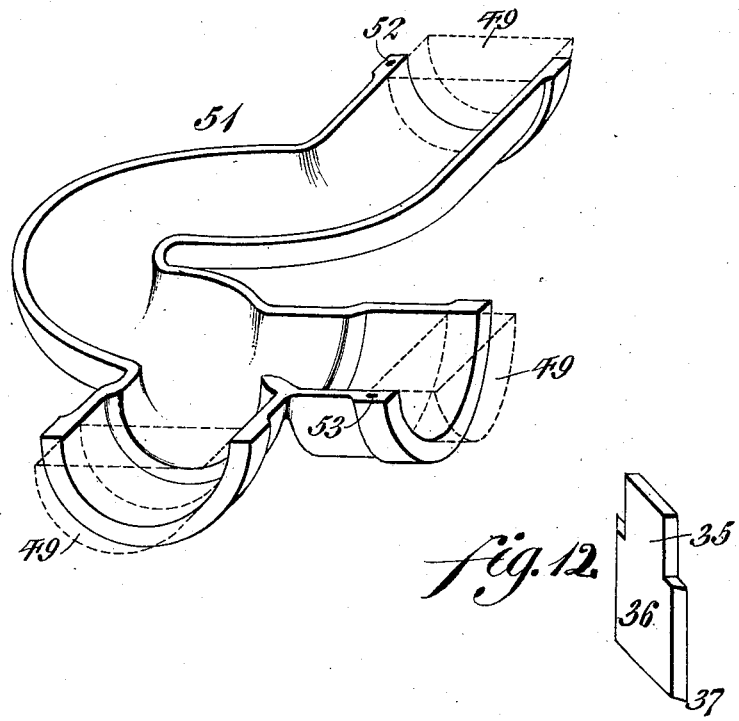
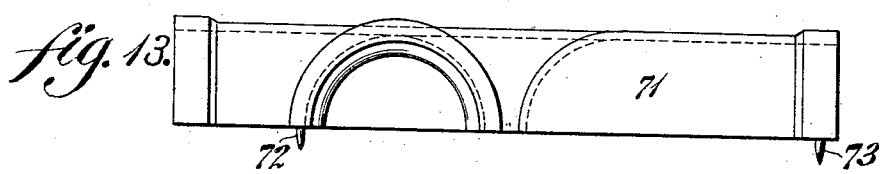
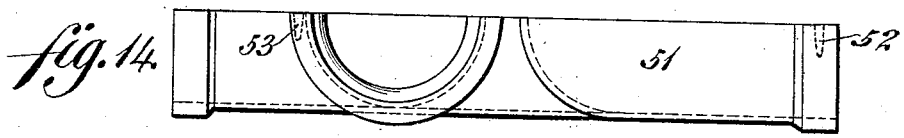
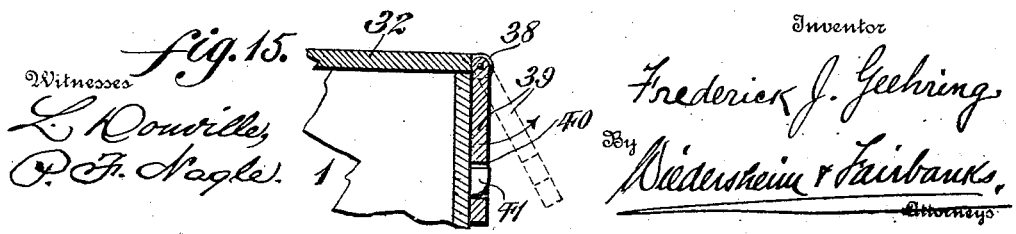

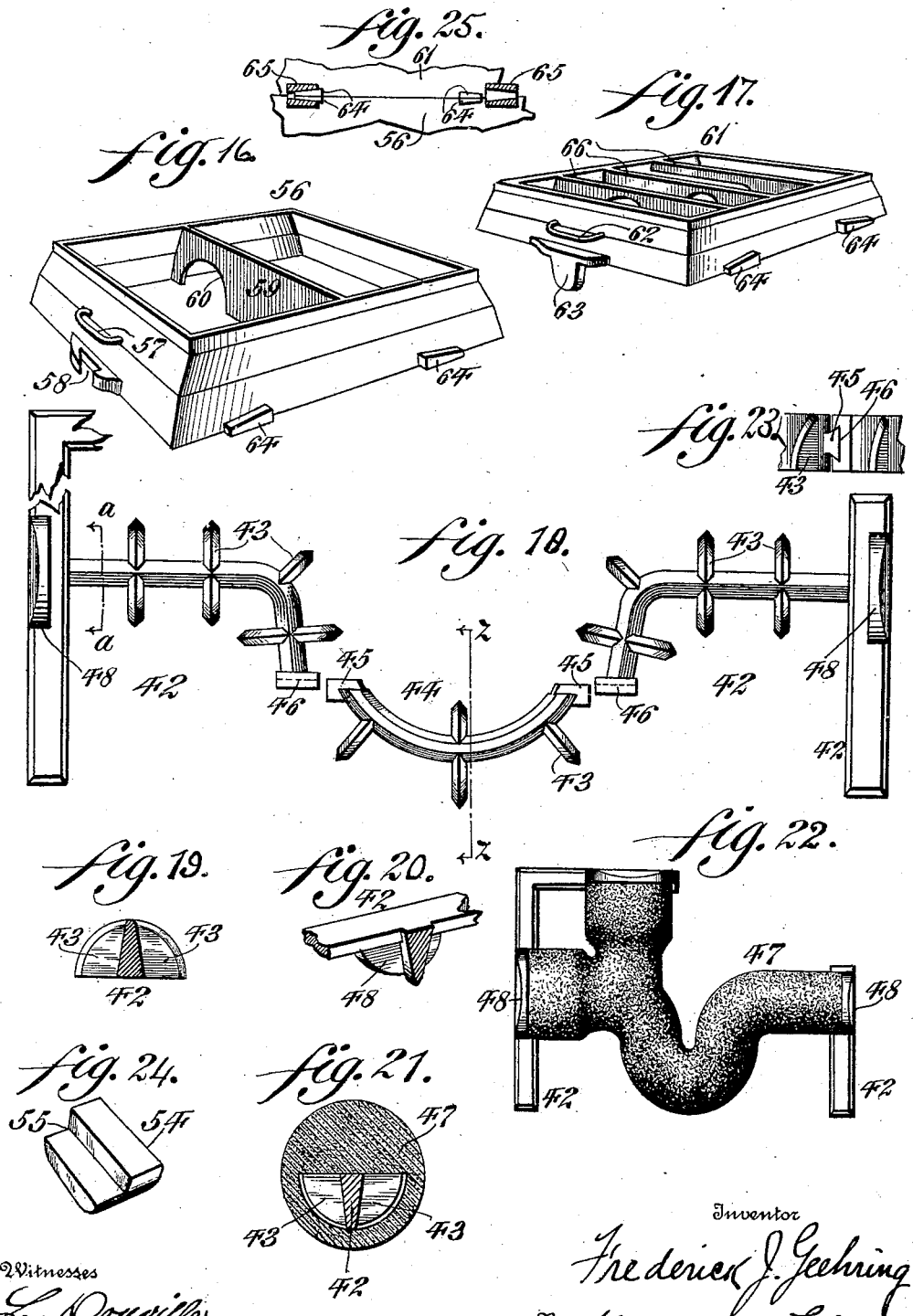

UNITED STATES PATENT OFFICE.

FREDERICK J. GEEHRING, OF PHILADELPHIA, PENNSYLVANIA.

MOLDING-MACHINE.

No. 868,979.          Specification of Letters Patent.          Patented Oct. 22, 1907.

Application filed January 23, 1907. Serial No. 353,612.

*To all whom it may concern:*

Be it known that I, FREDERICK J. GEEHRING, a subject of the Emperor of Germany, residing in the city and county of Philadelphia, State of Pennsylvania, have invented a new and useful Molding-Machine, of which the following is a specification.

My present invention consists of a novel construction of molding machine in which a reversible drop plate and stripping plate are employed whereby I am enabled to reduce to a minimum the time essential for the production of a satisfactory casting and wherein any desired type or contour of pipe fittings may be cast.

It further consists of a novel construction of a molding machine in which the flasks are hinged together and provided with suitable means for locking them in assembled position.

It further consists of a novel construction of reversible drop and stripping plates which are adapted to be secured in such a manner that they are always in proper alinement with the parts coacting therewith.

It further consists of other novel features of construction, all as will be hereinafter set forth.

For the purpose of illustrating my invention, I have shown in the accompanying drawings one form of a machine since this embodiment best illustrates the principles thereof and gives satisfactory and reliable results in practice, although it is to be understood that the various instrumentalities of which my invention consists can be variously arranged and organized and that my invention is not limited to the exact arrangement and organization of these instrumentalities as herein shown.

Figure 8:
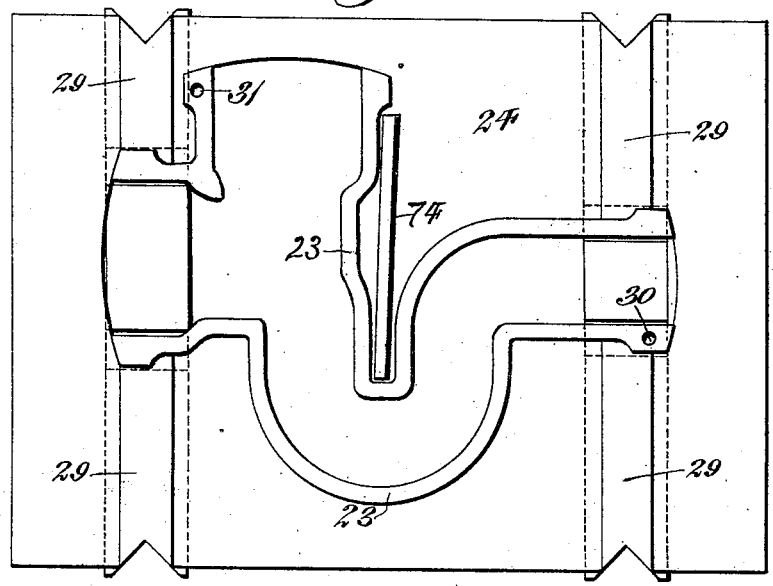
Figure 9:
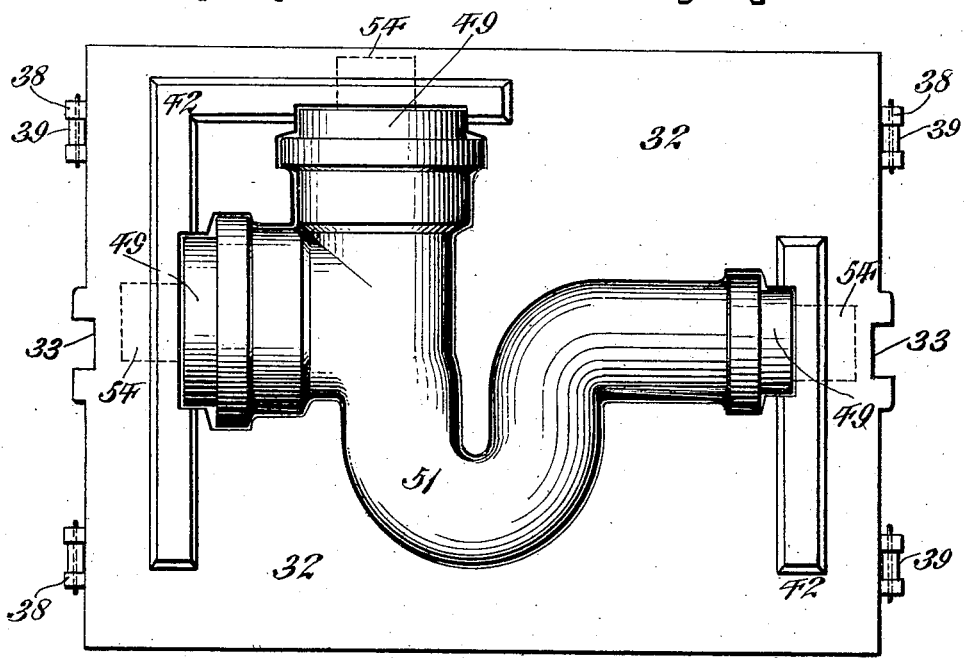
Figure 10:
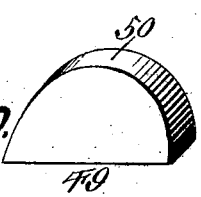

Figure 1 represents a plan view of a molding machine embodying my invention, certain parts thereof being removed for clearness of illustration. Fig. 2 represents a side elevation of Fig. 1. Fig. 3 represents a sectional view of a portion of Fig. 1. Fig. 4 represents a sectional view similar to Fig. 3, but showing the parts in a different relation to each other. Fig. 5 represents a plan view showing the drop plate in position, the stripping plate having been removed. Fig. 6 represents a section on line $x$—$x$ Fig. 5. Fig. 7 represents a section on line $y$—$y$ Fig. 1. Fig. 8 represents a plan view of the bottom plate. Fig. 9 represents a plan view of the top plate. Fig. 10 represents a perspective view of one of the prints seen in Fig. 9, in detached position. Fig. 11 represents a perspective view of one of the cores. Fig. 12 represents a perspective view of one of the locking members. Fig. 13 represents a side elevation of one of the patterns. Fig. 14 represents a side elevation of the other pattern. Fig. 15 represents a sectional view of Fig. 9, said section being taken through the fastening devices. Fig. 16 represents a perspective view of the bottom flask. Fig. 17 represents a perspective view of the top flask. Fig. 18 represents a plan view of the arbor. Fig. 19 represents a section on $z$ $z$ of Fig. 18. Fig. 20 represents a section on $a$ $a$ Fig. 18. Fig. 21 represents a sectional view of Fig. 22. Fig. 22 represents a plan view of the arbor and sand core. Fig. 23 represents a side elevation of a portion of Fig. 18 showing the manner in which the independent members of the arbor interlock. Fig. 24 represents a perspective view of one of the hand prints. Fig. 25 represents a side elevation of a portion of the upper and lower flasks in assembled position showing the manner in which the two flasks are secured in assembled position.

Similar numerals of reference indicate corresponding parts in the figures.

Referring to the drawings:—1 designates a casing, mounted on standards or supports 2 in any suitable manner.

3 designates guides carried by the casing 1 in which journal boxes 4 are movably mounted. The boxes are adjusted by means of set screws 5 provided with lock nuts 6, and passing through flanges or lugs 7 carried by the casing 1, the ends of said screws engaging the journal boxes 4.

8 designates rods or shafts journaled in the boxes 4 and passing through slots or openings 9 in the casing 1.

10 designates a link fixedly mounted on one of the shafts 8 and having one side thereof near its outer end cut away to form a shoulder 11 against which abuts during the operation a connecting arm or member 12, the forked end of which is pivoted at 13 to said link 10.

14 designates a link fixedly secured to the other of the shafts 8 and having its outer end recessed or cut away to form a shoulder or stop 15 for the arm 12, which latter is pivoted at 16 to said arm. The link 14 is provided with an actuating lever or handle 17.

18 designate cams mounted on the rods or shafts 8 and adapted to coact with cross bars 19, the ends of which have suitable grooves or recesses 20, preferably V shaped, therein.

21 designate guides carried by the casing 1 and with which the cross bars or pieces 19 engage.

22 designate grooves or slots in the cross members 19 in which are adapted to be seated the flanges or ribs 23 of a reversible drop plate 24, it being noted that these flanges or ribs are located on opposite sides of the plate 24.

25 designate guide members on the plate 24, the outer ends of which have preferably V shaped grooves 26 therein, it being noted that one of these guide members is cut away to leave room for the arbor which will hereinafter be described.

27 and 28 designate apertures in the ribs 23 on one side of the drop plate 24.

29 designate guide members on the opposite side of the plate 24 as seen in Fig. 8 and their ends are adapted to engage the guides 21. The ribs 23 are provided with apertures 30 and 31.

32 designates the reversible top or stripping plate which is provided with key ways 33 which register with key ways 34 carried by the casing 1, it being noted that the key way 33 is in the present instance substantially rectangular in form in order to coöperate with the ends 35 of the keys 36, the lower end 37 of said keys, as seen in Fig. 12, being adapted to be seated in the key ways 34 carried by the casing, so that any improper movement of the stripping plate 32 relative to the casing is positively prevented and the parts are always interlocked when in assembled position.

38 designates lugs carried by the stripping plate to which are pivoted latches 39 having apertures 40 therein with which lugs 41 carried by the casing 1 engage, as most clearly indicated in Fig. 15.

42 designates the arbor which as most clearly seen in Fig. 20 is in the present instance constructed in a plurality of parts provided with wings 43. The intermediate part 44 has tapered keys 45 at its ends which interlock with key ways 46 in the other two arbor members, said keys preferably tapering towards each other.

47 designates the sand forming the core.

The arbor 42 has secured thereto hemispherical blocks 48.

49 designate prints which as shown in Fig. 10 are semi-circular in cross-section and tapering as seen at 50.

51 designates a shell pattern which as seen in Fig. 11 is provided with apertures 52 and 53.

54 designates a hand print which as seen in Fig. 24 is cut away or recessed at 55 in order that the operator may insert his fingers beneath the shell pattern to remove the same.

56 designates the bottom flask which is provided with handles 57 and key ways 58.

59 designates a transverse member having a suitably shaped recess 60 therein, the contour of which corresponds to the article which is to be cast.

61 designates the top flask provided with handles 62 and lugs or keys 63 which are adapted to coöperate with the keyways 58 in the bottom flask 56.

64 designate preferably wedge shaped lugs on the flasks 56 and 61 with which fastening keys or members 65 engage to fasten the flasks together.

The flask 61 is provided with cross members 66 which are cut away to receive the article to be cast.

67 designates the core box comprising a bottom member 68 hinged at 69 to the member 70. The member 68 is cut away or chambered to receive a pattern 51 and the prints 49 as seen in Fig. 13 are shown in assembled position with respect thereto. The member 70 is cut away or chambered to receive the other pattern 71 and the prints 49 are shown in proper position with respect to the pattern 71. The pattern 71 is provided with pins 72 and 73 which coöperate with the apertures 53 and 52 in the other pattern 51 as may be clearly understood from Figs. 13 and 14.

74 designates a longitudinally extending member which serves as an extra support for the stripping plate and is adapted to rest upon the drop plate 24 as seen in Fig. 10.

The operation is as follows:—Having the parts as seen in Fig. 5, the locking member 36 are seated in the guides or ways 34 of the casing and the flask 56 together with the pattern 71 are placed on said casing so that the upper ends 35 of the members 36 engage with the guides 58 carried by the flask 56 The flask 56 is now rammed up, after which it is removed. The cross pieces 19 are reversed and the drop plate 24 and stripping plate 32 are turned over so that the ribs 23 on the reversed side of plate 24 will engage the grooves 22 in the cross pieces 19. The locking members 36 are removed and the flask 61 together with the pattern 51 are placed in position and suitably rammed up. Owing to the manner in which the different parts of the arbor interlock the same is maintained in assembled condition and any improper movement of the parts p evented. After the flask 56 has been rammed up this flask has to be reversed. The flask 61 is then rammed up and placed directly on top of the mold formed n the flask 56.

It is thought to be unnecessary to describe in detail the complete molding operation since the same is well known to those skilled in the art, but I wish to call special attention to the manner in which the drop plate is actuated. When the lever 17 is depressed the shafts 8 are rocked so that the cams 18 will co-act with the cross pieces 19 and raise the same together with the drop plate until the ribs on the latter are flush with the upper face of the stripping plate, it being noted that the shoulder 11 on the link 10 co-acts with the lever 12 to limit the amount of rotation given to the cams 18. When the lever 17 is raised the cams are rotated in a reverse direction, the amount of movement given to the rods or shafts 8 being limited by the engagement of the lever 12 with the shoulder 15 carried by the link 14, and the drop plate will be lowered so that the ribs 23 will be below the face of the stripping plate.

In the molding machines heretofore employed, the two castings have been made at a single operation. This makes the operating parts of the machine so heavy that it is necessary to employ from two to four men to operate the machine when castings such as are herein shown are produced.

In my novel construction of molding machine, I have so reduced the size and weight of the machine that the same can be operated by a single person and in order to bring about this result, I have devised a machine in which a single casting is made at a time and in order that the machine may be handled by a single operator I employ a novel constructon of reversible drop plate and stripping plate. Since the arbor is located on one side only of the stripping plate it is necessary that the stripping plate be reversed and since a right and left casting is to be produced, it is necessary that the drop plate be reversed as is evident to those skilled in the art.

It will now be understood that by the employment of a reversible drop plate and stripping plate the number of parts which it is necessary to employ to produce a reliable and satisfactory casting is reduced to a minimum, and not only is the machine itself greatly simplified but the number of casting which a molder is enabled to turn out greatly increased.

It is further to be noted that owing to the employment of my novel locking and alining mechanism that the co-acting parts will always be maintained in alinement and that the liability of imperfect castings being produced is practically eliminated.

It will now be apparent from the foregoing that I have devised a novel and useful construction of molding machines which embodies the features of advantage enumerated as desirable in the statement of invention and the above description and while I have preferred to show one embodiment thereof which has been found in practice to give satisfactory and reliable results it is to be understood that my invention is susceptible of modification in various particulars without departing from the spirit and scope of the invention or sacrificing any of its advantages.

Having thus described my invention, what I claim as new and desire to secure by Letters Patent, is:—

1. In a molding machine, a reversible drop plate having dissimilar pattern receiving means on opposite sides thereof, and means for actuating said plate.

2. In a molding machine, a reversible drop plate having dissimilar pattern receiving ribs on opposite sides thereof, and means for actuating said plate.

3. In a molding machine, a casing, a reversible drop plate having dissimilar pattern receiving ribs on opposite sides thereof movably mounted therein, a stripping plate different on opposite sides carried by said casing, and means for locking said stripping plate to said casing.

4. In a molding machine, a casing, a reversible drop plate having dissimilar pattern receiving ribs on opposite sides thereof movably mounted therein, a stripping plate different on opposite sides carried by said casing and a plurality of cams for actuating said drop plate.

5. In a molding machine, a casing, a reversible drop plate having dissimilar pattern receiving ribs on opposite sides thereof movably mounted therein, a reversible stripping plate different on opposite sides carried by said casing, and means for locking said plate to said casing.

6. In a molding machine, a casing, guide members carried thereby, a reversible drop plate having dissimilar pattern supporting ribs on opposite sides thereof guided by said members, a reversible stripping plate different on opposite sides carried by said casing, means for actuating said drop plate, and stops for limiting the movement of said means.

7. In a molding machine, a casing, guides therein, cross bars co-acting with said guides, a reversible drop plate having dissimilar pattern receiving ribs on opposite sides thereof carried by said bars, a stripping plate different on opposite sides carried by said casing, and means for actuating said drop plate.

8. In a molding machine, a casing, guides therein, cross bars co-acting with said guides, a reversible drop plate having dissimilar pattern receiving ribs on opposite sides thereof carried by said bars, means for preventing relative movement of said bars and drop plate, a stripping plate different on opposite sides carried by said casing, and means for actuating said drop plate.

9. In a molding machine, a casing, a reversible drop plate having dissimilar pattern supporting ribs on opposite sides thereof movably mounted therein, a reversible stripping plate different on opposite sides carried by said casing, latches pivoted to said stripping plate, and means on the casing co-acting with said latches to maintain said stripping plate and casing in assembled position.

10. In a molding machine, a casing, guides therein, cross bars co-acting with said guides, a reversible drop plate having dissimilar pattern supporting ribs on opposite sides thereof carried by said bars, means for preventing relative lateral movement of said plate and bars, a reversible stripping plate different on opposite sides carried by said casing, and guides carried by said casing and co-acting with said stripping plate to prevent improper lateral movement of the latter.

11. In a molding machine, a casing, a reversible dropped plate, having dissimilar pattern supporting ribs on opposite sides thereof movably mounted therein, a reversible stripping plate different on opposite sides detachably secured to said casing, means for actuating said drop plate, and adjusting devices for said actuating means.

12. In a molding machine, a casing, guides therein, cross bars engaging said guides, cam shafts adjustably mounted in said casing, cams on said shafts co-acting with said cross bars, means for vertically adjusting said shafts, actuating means for said shafts, a reversible drop plate having dissimilar pattern supporting ribs on opposite sides thereof engaging said guides, and a reversible stripping plate different on opposite sides detachably carried by said casing.

13. In a molding machine, a casing, a reversible drop plate having dissimilar pattern supporting ribs on opposite sides thereof movably mounted therein, a reversible stripping plate different on opposite sides carried by said casing and detachably secured thereto, supporting members carried by said drop plate adapted to engage said stripping plate when the former is in raised position, and means for actuating said drop plate.

14. In a molding machine, a casing, a reversible drop plate having dissimilar pattern supporting ribs on opposite sides thereof movably mounted thereon, a reversible stripping plate carried by said casing, latches pivoted to said stripping plate and lugs on the casing co-acting with said latches to maintain said stripping plate and casing in assembled position.

FREDRICK J. GEEHRING.

Witnesses:
 JOHN PHILLIPP,
 WM. G. HERON.